Sept. 13, 1949.   R. E. LORENZEN   2,481,604
DEMOUNTABLE WORK TRAY

Filed July 1, 1947

INVENTOR.
Roger E. Lorenzen
BY
ATTORNEY

Patented Sept. 13, 1949

2,481,604

UNITED STATES PATENT OFFICE 2,481,604

DEMOUNTABLE WORK TRAY

Roger E. Lorenzen, Niles, Mich.

Application July 1, 1947, Serial No. 758,241

1 Claim. (Cl. 211—86)

This invention relates to improvements in a demountable work tray.

The principal objects of this invention are:

First, to provide a demountable work tray for machine tools such as a drill press which is easily mounted and demounted from the press without the use of tools.

Second, to provide a work tray which is easily mounted on a cylindrical portion of a machine tool and swingable to any angular position for the convenience of the machine operator.

Third, to provide a work tray support which may be securely attached either singularly or in pairs to the pedestal of a machine tool.

Fourth, to provide a work tray support which is extremely simple to attach and inexpensive to manufacture.

Other objects and advantages relating to the details and economies of the invention will be apparent from the following description and claim.

The drawings, of which there is one sheet, illustrate a preferred form of my work tray support.

Figure 1:
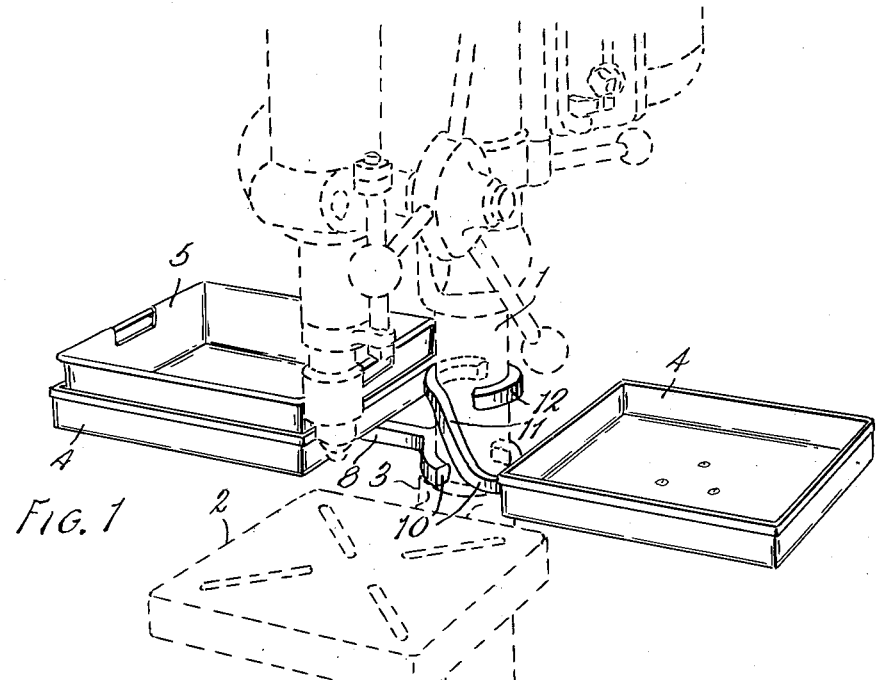
Fig. 1 is a perspective view of a pair of my work trays mounted on the pedestal of a drill press, the drill press being shown in dotted lines.
Figure 2:
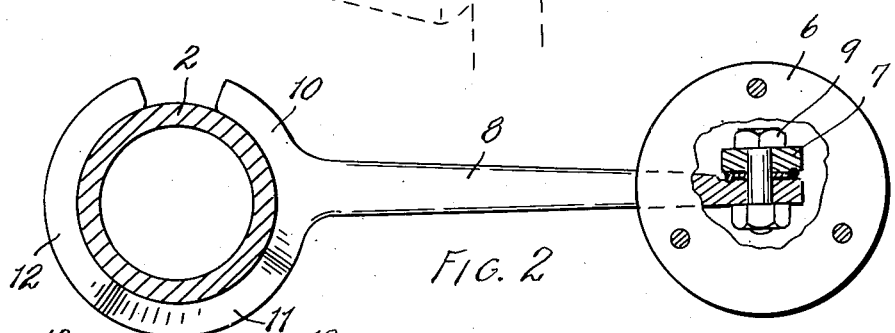
Fig. 2 is a plan view partially broken away of my work tray support with the tray portion removed.
Figure 3:
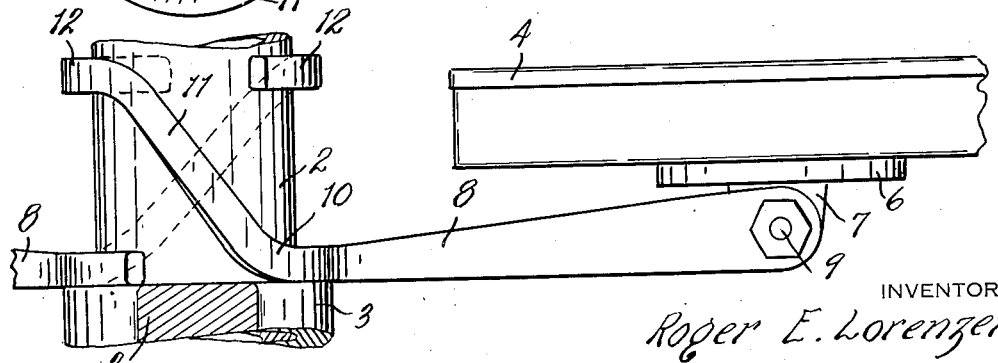
Fig. 3 is a fragmentary enlarged elevational view partially in section of the drill press shown in Fig. 1 showing the connection of my work trays therewith.

The dotted lines in Fig. 1 illustrate a drill press having the usual cylindrical supporting pedestal 1 and a work table 2 which is adjustably supported on the pedestal by the sleeve portion 3. Two work trays 4 are illustrated, one being mounted on each side of the pedestal to support work pieces where they may be conveniently reached by the machine operator. Preferably the work trays 4 are of leak proof metal construction arranged to catch any oil which may drip from the work pieces. If desired work baskets 5 may be provided for fitting in the work trays.

The work tray 4 is secured to and supported on a circular support plate 6 which is provided with a depending ear 7 secured to one end of a support arm 8. Normally the tray will be clamped in a horizontal position as shown by the nut 9 but if desired the tray and support plate may be tilted at an angle with respect to the support arm.

The inner end of the support arm is provided with a curved fork portion 10 arranged to embrace the side of the pedestal 1 throughout slightly less than 180 degrees of the circumference of the pedestal and to rest upon the sleeve 3 of the work table. One end of the curved portion 10 extends upwardly in a spiral portion 11 also embracing the side of the pedestal and terminating in an upper hook portion 12 spaced above and opening opposite to the lower fork portion 10. The open ends of the lower fork portion 10 and upper hook portion 12 are spaced apart by a distance greater than the diameter of the pedestal 1 so that the support arm 8 and the work tray carried thereby may easily be removed from the pedestal by tilting the support arm and work tray until the open ends of the fork portion and hook portion will clear the pedestal 1.

The weight of the work tray and the work pieces supported therein is supported from the fork portion 10 by the sleeve 3 of the work table and the tilting moment of the work tray about its support is opposed by engagement of the hook portion 12 with the pedestal 1. In this position the work tray may be rotated around the pedestal to any angular position and one of the work trays may be easily removed without interfering with the other work tray. The spaced pedestal engaging fork portion and hook portion securely support the work tray on the pedestal and are easily applied to or removed from the pedestal without the use of any tools so that the trays may be removed or applied as desired.

I have thus described a highly practical commercial embodiment of my work tray support in connection with a drill press. It should be understood that my support is equally applicable to other types of machine tools having a vertical pedestal and that various forms of work trays and their connection to the support arm are possible and I do not limit my invention to the particular tray and connection shown.

Having thus described my invention, what I claim as new and desire to secure by Letters Patent, is:

A work holding device for a machine tool having a cylindrical pedestal with a shoulder therearound, comprising, an arm, a work receiving tray secured to one end of said arm, an integral cylindrically curved fork portion on the other end of said arm extending transversely of said arm and adapted to rest on said shoulder and abut against said pedestal, and an integral spiral portion merging with one end of said fork portion and terminating in a cylindrically curved hook portion opposed to said fork portion and spaced thereabove.

ROGER E. LORENZEN.

REFERENCES CITED

The following references are of record in the file of this patent:

UNITED STATES PATENTS

| Number | Name | Date |
|---|---|---|
| 1,131,540 | Nerenhausen | Mar. 9, 1915 |
| 1,220,578 | Wise | Mar. 27, 1917 |
| 1,430,016 | Koltunski | Sept. 26, 1922 |
| 1,955,209 | Tyler | Apr. 17, 1934 |

FOREIGN PATENTS

| Number | Country | Date |
|---|---|---|
| 15,785 | Great Britain | 1895 |